US009891754B2

(12) United States Patent
Lim et al.

(10) Patent No.: US 9,891,754 B2
(45) Date of Patent: Feb. 13, 2018

(54) METHOD FOR CONTROLLING DISPLAY AND DEVICE USING THE SAME

(75) Inventors: Eun Young Lim, Seoul (KR); Min Kyu Park, Gyeonggi-do (KR); Hee Jeong Choo, Gyeonggi-do (KR); Hyun Ki Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1253 days.

(21) Appl. No.: 12/706,034

(22) Filed: Feb. 16, 2010

(65) Prior Publication Data

US 2010/0214322 A1    Aug. 26, 2010

(30) Foreign Application Priority Data

Feb. 24, 2009    (KR) ........................ 10-2009-0015299

(51) Int. Cl.
  G06F 3/042    (2006.01)
  G06F 3/0482    (2013.01)
  G06F 3/0485    (2013.01)
  G06F 3/0488    (2013.01)

(52) U.S. Cl.
  CPC ............ *G06F 3/042* (2013.01); *G06F 3/0482* (2013.01); *G06F 3/0485* (2013.01); *G06F 3/04883* (2013.01); *G06F 2203/04808* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,043,809 A | * | 3/2000 | Holehan | 345/168 |
| 6,191,773 B1 | * | 2/2001 | Maruno et al. | 345/158 |
| 6,489,951 B1 | * | 12/2002 | Wong et al. | 345/173 |
| 2002/0030667 A1 | * | 3/2002 | Hinckley et al. | 345/173 |
| 2003/0122787 A1 | * | 7/2003 | Zimmerman et al. | 345/173 |
| 2003/0146899 A1 | | 8/2003 | Sakurai et al. | |
| 2004/0150668 A1 | * | 8/2004 | Myers et al. | 345/771 |
| 2005/0162381 A1 | * | 7/2005 | Bell et al. | 345/156 |
| 2006/0001650 A1 | * | 1/2006 | Robbins | G06F 3/0421 345/173 |
| 2006/0161871 A1 | * | 7/2006 | Hotelling et al. | 715/863 |
| 2006/0284852 A1 | * | 12/2006 | Hofmeister et al. | 345/173 |
| 2008/0120577 A1 | | 5/2008 | Ma et al. | |

(Continued)

FOREIGN PATENT DOCUMENTS

| | | |
|---|---|---|
| JP | 2003-303048 A | 10/2003 |
| JP | 2004-78977 A | 3/2004 |
| KR | 10-2008-0045510 A | 5/2008 |

*Primary Examiner* — Lun-Yi Lao
*Assistant Examiner* — Kelly Hegarty
(74) *Attorney, Agent, or Firm* — Cha & Reiter, LLC.

(57) ABSTRACT

Disclosed is a method for controlling a display and a display using the same. The method includes: detecting the approach of a user's hand to the display unit, determining a user's input hand shape; and displaying a display screen corresponds to the determined user's input hand shape. Through the present invention, a user may render a higher menu list and a lower menu list to be displayed on one screen, and may control display screen shift direction and speed, merely by performing a finger extending and folding action. Further, the user may control the size of a display screen by inputting the finger extending and folding action.

15 Claims, 8 Drawing Sheets

(56) References Cited

U.S. PATENT DOCUMENTS

| | | | |
|---|---|---|---|
| 2008/0121442 A1* | 5/2008 | Boer et al. | 178/18.09 |
| 2008/0122792 A1* | 5/2008 | Izadi et al. | 345/173 |
| 2008/0122803 A1* | 5/2008 | Izadi et al. | 345/175 |
| 2008/0150913 A1* | 6/2008 | Bell et al. | 345/175 |
| 2008/0165140 A1* | 7/2008 | Christie et al. | 345/173 |
| 2008/0165255 A1* | 7/2008 | Christie et al. | 348/207.99 |
| 2008/0281851 A1* | 11/2008 | Izadi et al. | 707/102 |
| 2008/0297482 A1* | 12/2008 | Weiss | 345/173 |
| 2009/0082951 A1* | 3/2009 | Graessley | 701/200 |
| 2009/0178011 A1* | 7/2009 | Ording et al. | 715/863 |
| 2009/0258677 A1* | 10/2009 | Ellis et al. | 455/556.1 |
| 2011/0169762 A1* | 7/2011 | Weiss | 345/173 |
| 2011/0175830 A1* | 7/2011 | Miyazawa et al. | 345/173 |
| 2012/0304128 A1* | 11/2012 | Woo et al. | 715/848 |
| 2013/0074011 A1* | 3/2013 | Nakamura | G06F 1/1616 715/854 |

* cited by examiner

METHOD FOR CONTROLLING DISPLAY AND DEVICE USING THE SAME

CLAIM OF PRIORITY

This application claims priority to and the benefit of Korean Patent Application No. 10-2009-0015299, filed in the Korean Intellectual Property Office on Feb. 24, 2009, the entire contents of which are incorporated herein by reference.

BACKGROUND OF THE INVENTION

Field of the Invention

The present invention relates to a display interface, and more particularly, to a device and its method of controlling a display of a screen through various hand movements.

Description of the Related Art

Recently, portable terminals have become a necessity in modern life. With a widespread usage, user interface technologies for controlling the portable terminals have been continuously improved.

Although user interfaces were implemented through a keypad in the past, touch screens have become a popular choice of portable terminals. Portable terminals that are currently available in the market employ a capacitive touch sensor or a pressure-sensitive touch sensor. Recently, efforts to apply an optical touch sensor, such as photo sensor, to a touch screen have been made. The photo sensor senses light in recognizing user's touch and manipulation.

The present invention relates to a display method which can be employed in a portable terminal or a display device provided with a photo sensor for controlling a display according to a user's input type.

SUMMARY OF THE INVENTION

The present invention provides a method for controlling the display of a menu list by estimating a user's input hand shape.

Also, the present invention provides a method for controlling the display screen shift direction and speed by estimating a user's input hand shape.

In addition, the present invention provides a method for controlling the size of a display screen by estimating a user's input hand shape.

Moreover, the present invention provides a display device employing at least one of the above-mentioned methods.

In accordance with an aspect of the present invention, a method for controlling a display includes: recognizing the approach of a user's hand; estimating a user's input hand shape; and displaying a display screen set to correspond to the estimated user's input hand shape.

In accordance with another aspect of the present invention, a display control device includes: a sensor unit for detecting light reflected by a user's hand; a control unit for estimating a user's input hand shape on the basis of the detected light; and a display unit for displaying a display screen set to correspond to the user's input hand shape.

The present invention enables a user to render a higher menu list and a lower menu list to be simultaneously displayed on a single screen, and to render the shift direction and speed of the display screen to be determined merely by performing a finger folding and extending action. Further, the user can control the size of the display screen by inputting the finger folding and extending action.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Although exemplary embodiments of the present invention are described below with reference to a portable terminal by way of an example, the present invention is not limited to this, and can be applied to a large display device, such as a TV set, a desk-top computer, and a notebook computer.

The portable terminal in accordance with the exemplary embodiment of the present invention is a terminal provided with an optical touch sensor, and may preferably include other types of information communication devices and multimedia devices, such as a mobile communication terminal, a portable multimedia player (PMP), a personal digital assistant (PDA), a smart phone, and an MP3 player, and all the applications thereof.

Figure 1:
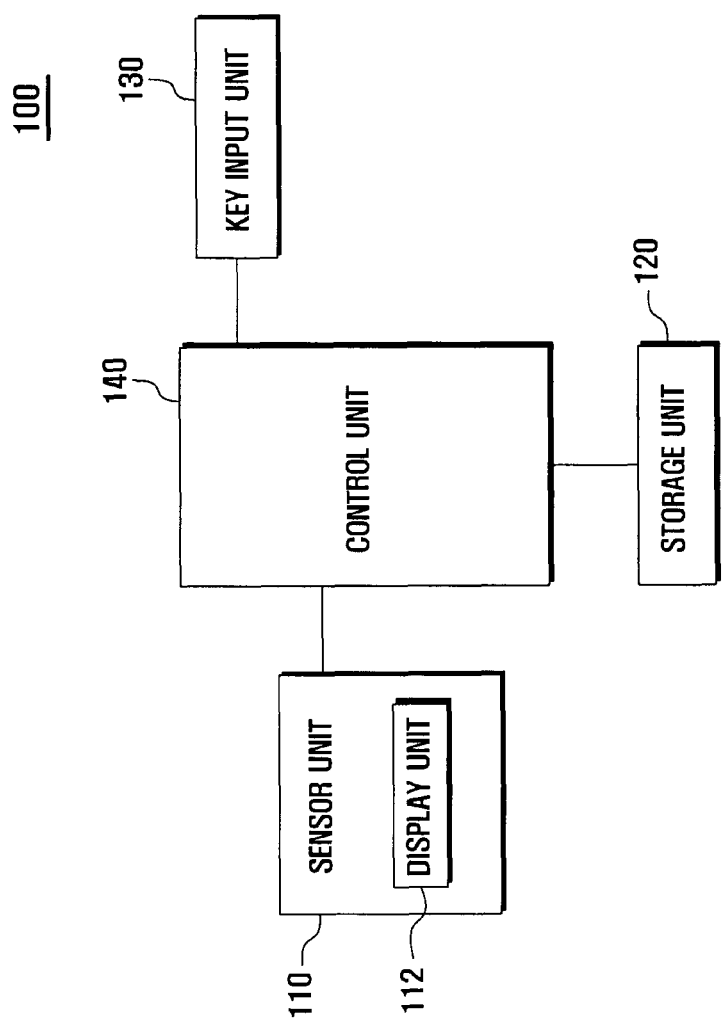
FIG. 1 shows a construction of a portable terminal in accordance with an embodiment of the present invention.

FIG. 1 shows a construction of a portable terminal 100 in accordance with an embodiment of the present invention.

The portable terminal 100 includes a sensor unit 110, which may be a photo sensor for detecting an object using light. The photo sensor can detect whether an object exists or not, and whether the object goes past the photo sensor or not, as well as the size, color, and brightness and darkness of the object. Such a sensor may be classified into a transmissive photo sensor, a mirror-reflection type photo sensor, and a direct reflection type photo sensor. Preferably, the sensor unit 110 in the present invention is configured using the direct reflection type photo sensor. The direct reflection type photo sensor has a light-transmission unit and a light-reception unit which are integrated with each other. The light-transmission unit is preferably formed from a light emitting diode (LED), and the light-reception unit is preferably formed from a photo diode. In the present invention, the light-transmission unit performs the role of a display unit 112, and the light-transmission unit is preferably formed from an organic light emitting diode (OLED).

In accordance with the embodiment of the present invention, the sensor unit 110 recognizes the approach or touch of a user's hand, generates a sensor signal containing information concerning the user's input hand shape, and transmits the signal to a control unit 140. Note that a right or left hand is for illustrative purposes, but other parts of body or input object may be used in accordance with the teachings of the present invention. In an alternate embodiment, the sensor unit 110 may be formed from an image sensor. The sensor unit 110 may be separated from the display unit, wherein the sensor unit 110 recognizes the approach of a user's hand, generates a sensor signal containing information concerning the user's input hand shape, and transmits the signal to the control unit 140.

The display unit 112 may be formed from OLEDs, and visually provide, to the user, menus, input data, function setup information, and other various information items of the portable terminal. For example, the display unit 112 executes a function for outputting a booting screen, a standby screen, a display screen, a communication screen, and other application executing screens. The display unit 112 in accordance with the present invention serves to display menu lists, each of which has a depth set according to a user's input hand shape. In addition, the display unit 112 shifts a display screen according to the user's input hand shape, thereby displaying a shifted display. The display unit 112 in accordance with the present embodiment may change the size of an application implementing screen window according to the user's input hand shape, thereby displaying a size-changed application implementing screen.

The storage unit 120 serves to store programs and data required for operating the portable terminal. The storage unit 120 in accordance with the present embodiment stores a program for estimating a user's input hand shape on the basis of a sensor signal generated from the sensor unit 110. The storage unit 120 serves to store image information items which provide a standard for estimating a user's input hand shape. In addition, the storage unit 120 serves to store display screen data, each of which corresponds to a user's input hand shape.

The key input unit 130 serves to transmit a user's key-operating signal input to the control unit 140. The key input unit 130 may be a key pad including numeric keys and directional keys, or may be formed on a side of the portable terminal only with predetermined function keys. In the embodiment, if all the functions of the portable terminal can be executed only with the sensor unit 110, it is possible to omit the key input unit 130.

The control unit 140 serves to control the entire operation of the portable terminal. The control unit 140 in accordance with the present embodiment serves to receive a sensor signal from the sensor unit 110, and to estimate a user's input hand shape. The control unit 140 estimates the user's input hand shape by comparing an information item concerning the light detected by the sensor unit 110 with image information items, which are stored in the storage unit 120. The image information items provide a standard for estimating a user's input hand shape. The control unit 140 further estimates the number of a user's extended fingers through the above-mentioned comparing step. The control unit 140 in accordance with the present embodiment also serves to estimate an input area of the user's hand using the information concerning the light detected by the sensor. The determination as to whether the user's hand is adjacent to the sensor unit 110 is made with reference to whether the user's hand is positioned within a preset distance from the sensor unit 110. The preset distance may be set in the portable terminal 100 as a fixed distance, and may be changed through a user's personal settings. In addition, the control unit 140 may estimate the position of a user's finger by receiving the sensor signal from the sensor unit 110.

The control unit 140 in accordance with the present embodiment serves to determine the depth of a menu list being displayed according to the number of a user's extended fingers. After determining the depth of the menu list, the control unit 140 in accordance with the present embodiment controls the display unit 112 to display all the menu lists from a first depth to the determined depth. The control unit 140 also estimates the number of the user's extended fingers, and determines a display screen shift speed corresponding to the number of the user's extended fingers. Then, the control unit 140 controls the display unit 112 to shift the display screen with the determined speed, thereby displaying a new display screen. The control unit 140 may further estimate the area of the user's hand and determine the size of the display screen window corresponding to the area. The control unit 140 controls the display unit 112 to display the display screen according to the determined size of the window. As the user's input hand shape is changed, the control unit 140 may measure the changed amount of the input area of the user's hand, and control the display unit 112 to adjust the size of the display screen to correspond to the changed amount of the area proportionally, thereby displaying the size-adjusted display screen. The control unit 140 may estimate whether the changed amount of the area exceeds a preset threshold, and if it is estimated that the changed amount of the area exceeds the preset threshold, the control unit 140 may terminate the currently executed application.

Figure 2:
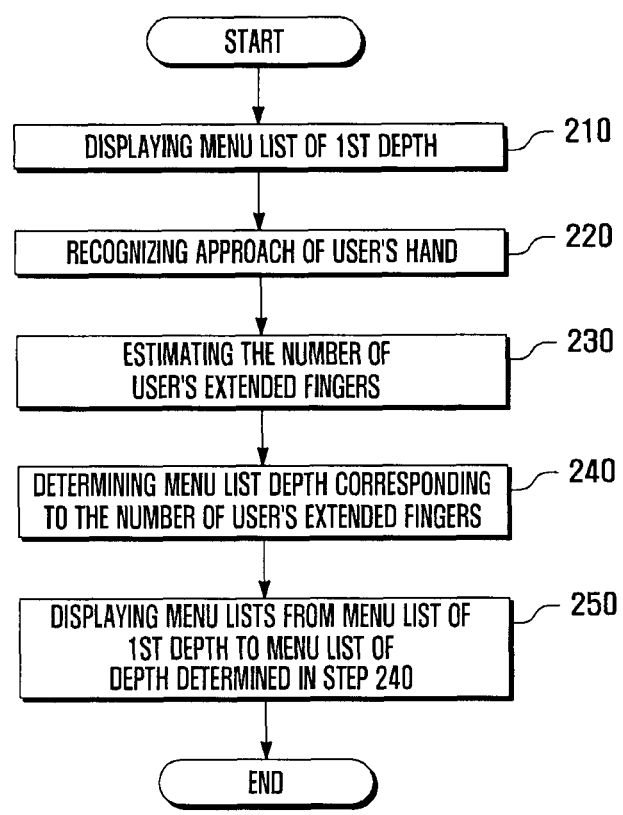
FIG. 2 is a flowchart showing a method for controlling a display in accordance with a first embodiment of the present invention.

FIG. 2 is a flowchart showing a method for controlling a display in accordance with a first embodiment of the present invention.

In step 210, the control unit 140 controls 112 to display the menu list at a first depth. The menu list of the first depth may correspond to the highest menu list among menu lists for a specific application, or may correspond to the highest menu list among menu lists currently displayed on the display unit 112. For example, if the portable terminal currently executes a standby screen application, the menu list of the first depth may include application menus, such as sounds, screen and content storage boxes, messages, and a diary.

Figure 8:
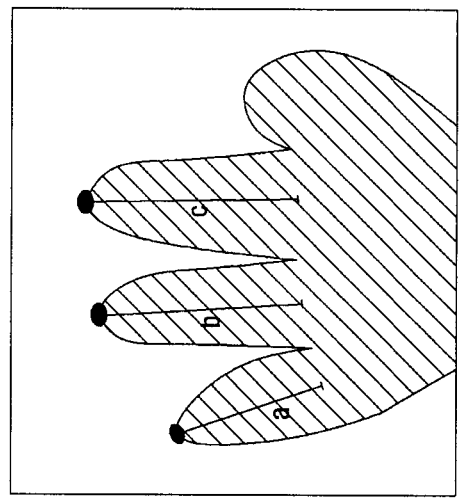
FIG. 8 shows a user's input hand shape sensed by a sensor unit in accordance with an embodiment of the present invention.

In step 220, the control unit 140 controls the sensor unit 110 to estimate whether the user's hand is adjacent to the sensor unit or not. If the user's hand is adjacent to the sensor unit 110, the sensor unit 110 transmits a sensor signal indicative of the user's hand being adjacent to the control unit 140. More specifically, when the user's hand is adjacent to the sensor unit 110, light projected from the light-transmission unit of the sensor unit 110 is reflected by the user's hand and introduced into the light-reception unit. The sensor unit 110 detects the reflected light, and generates a sensor signal containing information concerning the detected light. FIG. 8 shows information concerning the light detected by the sensor unit 110. Since the light projected from the light-transmission unit of the sensor unit 110 is reflected according to the shape of the user's hand, the sensor unit 110 detects the reflected light similar to the shape of the user's hand. If the user changes his/her input hand shape after the hand is adjacent to the sensor unit, the sensor unit 110 estimates that the detected light is changed, and generates and transmits a sensor signal indicative of the change to the control unit 140. Here, the transmitted sensor signal contains information concerning the light reflected and detected according to the changes in the input hand shape.

In step 230, the control unit 140 estimates the number of the user's extended fingers on the basis of the sensor signal received from the sensor unit 110. The control unit 140 of the present embodiment compares the sensor signal containing information concerning the detected light with image information items which are prestored in the storage unit 120 and estimates the number of the user's extended fingers. Note that the control unit 140 receives the sensor signal containing information concerning the detected light from the sensor unit 110. However, the control unit 140 cannot identify an input shape hand (ex, the number of the user's extended fingers) using only the received sensor signal. In the storage unit 120, a plurality of image information items corresponding the number of the user's extended fingers are stored. A look up data is prestored to provide an estimate of a number of extended fingers that matches the detected light from the sensor unit 110. The control unit 140 identifies the number of the user's extended fingers by comparing the information concerning the detected light with the plurality of image information items to obtain an estimate of number of fingers. Thus, the control unit 140 identifies an input shape hand image information image corresponding to the light detected through the comparing step. It is possible to set an error range in each input hand shape image item in terms of the lengths of fingers, and inter-finger spaces. In this event, the control unit estimates whether the information concerning the detected light is included in the error range for the input hand shape image information item. Upon identifying an input hand shape image information item coinciding with the information concerning the light detected by the sensor unit 110, the control unit 140 can estimate the number of a user's extended fingers. According to the present embodiment, since the number of extended fingers is set in each of the input hand shape information items, the number of the user's extended fingers can be found when the control unit 140 identifies the input hand shape information item corresponding to the information concerning the light detected by the sensor unit 110. The control unit 140 can estimate the input positions of the user's fingers on the basis of the sensor signal received from the sensor unit 110. After finding the number of the user's extended fingers by comparing the information concerning the light detected by the sensor unit 110 with the input hand shape information items, the control unit 140 analyzes the coordinates of the end joints of the fingers from the information item concerning the detected light. Referring to FIG. 8, the control unit 140 analyzes the coordinates of the dot-indicated parts of the fingers, and through this analysis, the control unit 140 can estimate the input positions of the user's fingers.

In step 240, the control unit 140 determines the depth of a menu list corresponding to the estimated number of the user's extended fingers. The depth of a menu list means the number of layers up to the determined menu list when menu lists are sequentially enumerated from the highest menu list to the lowest menu list. That is, if a specific menu included in the highest menu list includes a first lowest menu list and a specific menu included in the first lowest menu list includes a second lowest menu list, it can be said that the depth of the second highest menu list corresponds to "3" (the highest menu list-the first lowest menu list-the second lowest menu list). The control unit 140 determines the depth of a menu list according to the number of the user's extended fingers. The depth of a menu list is determined according to a scenario set in the portable terminal, and can be changed according to a user's personal settings. Assuming that the scenario is set in such a manner that the depth of a menu list is determined as the number of a user's extended fingers, the control unit 140 determines the depth of a corresponding menu list as "3" if the number of the user's extended fingers is three. In addition, assuming that the scenario is set in such a manner that the depth of a menu list is determined as the number which is smaller by one (1) than the number of a user's extended fingers, the control unit 140 determines the depth of a corresponding menu list as "2" if the number of the user's extended fingers is three. In essence, number of extended fingers detected by the sensor determines which menu list to be displayed in a hierarchal order.

In step 250, the control unit 140 controls the display unit 112 to display menu lists from the first depth (e.g., the highest menu list) to the depth determined in the step 240. When the menu lists are displayed in accordance with the present embodiment, the control unit 140 may confirm a point where a user's finger is positioned, and may control the display unit 112 to display a menu list on the confirmed area of the display unit 112. For example, the control unit 140 may control the display unit to display a menu list on a region of the display unit 112 positioned nearest to the point where the user's finger is positioned.

In addition, if the user extends two or more fingers, the control unit 140 may control the display unit so that menu lists are displayed according to the arranged order of the extended fingers. For example, if the user extends and approaches three fingers to the sensor unit 110, the control unit 140 may control the display unit 112 to display the menu list of the first depth corresponding to the leftmost finger, the menu list of the second depth corresponding to the central finger, and the menu list of the third depth corresponding to the rightmost finger. Similarly, when a menu list is displayed under the control of the control unit 140, the menu list can be displayed with reference to a point where a tip end of a user's finger is positioned. That is, the control unit 140 may control the display unit 112 in such a manner that a menu positioned at the uppermost position on the menu list is positioned at the point where the tip of the user's finger is positioned.

Figure 3:
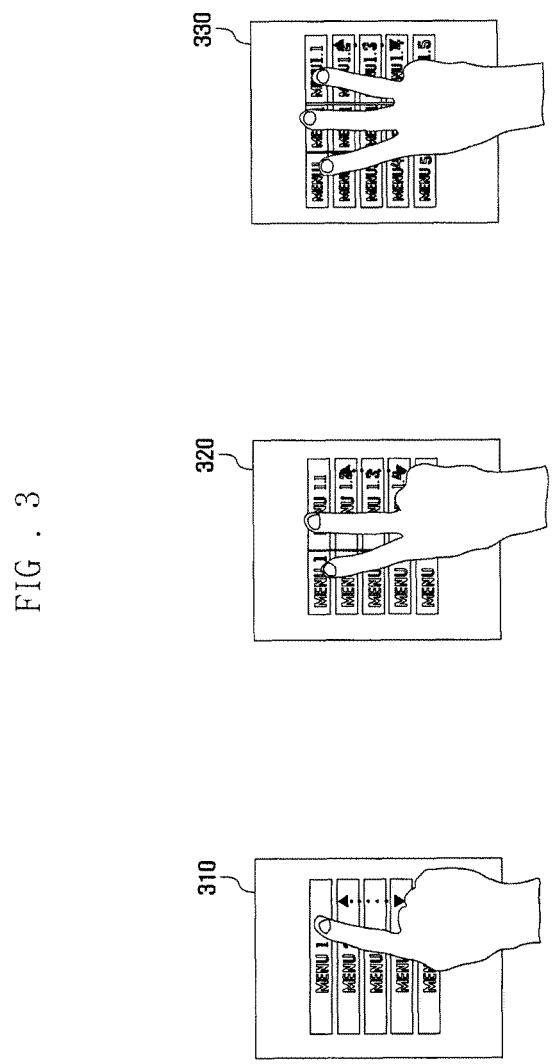
FIG. 3 shows display screens in accordance with the first embodiment of the present invention.

In an alternate embodiment, if the user changes the input hand shape after approaching his/her hand to the sensor unit 110, the control unit 140 may make a control in such a manner that a menu list corresponding to the changed input hand shape can be displayed. FIG. 3 shows display screens which display the number of menu lists each time when the user extends fingers one after another, wherein the depths of the menu lists correspond to the user's extended fingers, respectively. The display screen 310 shows that the user approaches his/her thumb to the sensor unit in the state in which the menu list of the first depth (Menu 1, Menu 2, . . . ) is displayed. If the user extends and approaches his/her thumb to the sensor unit 110 in the standby screen status or in a state in which a specific application is executed, the control unit 140 controls the display unit 140 to display the menu list of the first depth.

If the user extends his/her middle finger in the state in which the menu list of the first depth is displayed, the sensor unit 110 recognizes that the user's input hand shape has changed, and transmits a sensor signal concerning the changed user's input hand shape to the control unit 140. The control unit 140 estimates that the number of the user's extended fingers is two on the basis of the sensor signal received from the sensor unit 110. The control unit 140 compares the information concerning the light detected by the sensor unit 110 with the user's input hand shape image information items, thereby estimating/determining the number of the user's extended fingers as two. The control unit 140 estimates the point where the extended finger (middle finger) is positioned, and controls the display unit 112 to display the menu list of the second depth on the region of the display unit 112 corresponding to the estimated point. Reference numeral 320 shows a display screen, on which a menu list of a depth corresponding to the user's middle finger is displayed when the user extends his/her middle finger. On the display screen 320, the display unit 112 displays the menu list of the first depth (Menu 1, Menu 2, . . . ) and the menu list of the second depth (Menu 1.1, Menu 1.2, . . . ) in unison. If the user extends his/her ring finger in the above-mentioned manner, the control unit 140 controls the display unit 112 to display the menu list of the third depth (Menu 1.1.1, Menu 1.1.2, . . . ) together with the menu list of the first depth (Menu 1, Menu 2, . . . ) and the menu list of the second depth (Menu 1.1, Menu 1.2, . . . ). Since the menu lists of depths corresponding to the number of a user's extended fingers are displayed in unison, it is possible for the user to confirm the menus of different depths on a single display screen.

Alternatively, the control unit 140 may make a control so as to change a lower menu list according to the position of the tip end of a user's finger, thereby displaying another lower menu list corresponding to the position of the tip end of a user's finger. As shown on the display screen 310 in FIG. 3, the user approaches the tip end of his/her thumb to "Menu 1," in the state in which the menu list of the first depth is displayed. Then, if the user extends his/her middle finger as shown on the display screen 320 in FIG. 3, the control unit 140 controls the display unit 112 to display the lower menu list (Menu 1.1, Menu 1.2, . . . ) of the "Menu 1." That is, if the user extends a new finger, the control unit 140 makes a control so as to display the lower menu list for the menu, to which the previously extended finger is adjacent. On the display screen 310 in FIG. 3, if it is desired to confirm the lower menu list (Menu 2.1, Menu 2.2, . . . ) of the "Menu 2," the user can confirm the lower menu list by positioning the tip end of the thumb on the "Menu 2" and then extending the middle finger.

Alternatively, if the user changes the position of an extended finger, the control unit 140 may control the display unit 112 to change the position of the menus included in the corresponding menu list, thereby displaying new menus. On the display screen 320 in FIG. 3, if the user scrolls his/her middle finger up and down, the control unit 140 controls the display unit 112 to display "Menu 1.6," "Menu 1.7," etc. that are not currently displayed. If the user scrolls his/her thumb up and down, the control unit 140 controls the display unit 112 to display "Menu 6," "Menu 7," etc. that are not currently displayed by moving up the second row of menu list. Thereafter, if the user scrolls his/her thumb so that the "Menu 6" is positioned at the tip end of the thumb, the control unit 140 controls the display unit 112 to display the lower menu list (Menu 6.1, Menu 6.2, . . . ) of the "Menu 6," as the menu list of the depth corresponding to the middle finger.

Figure 4:
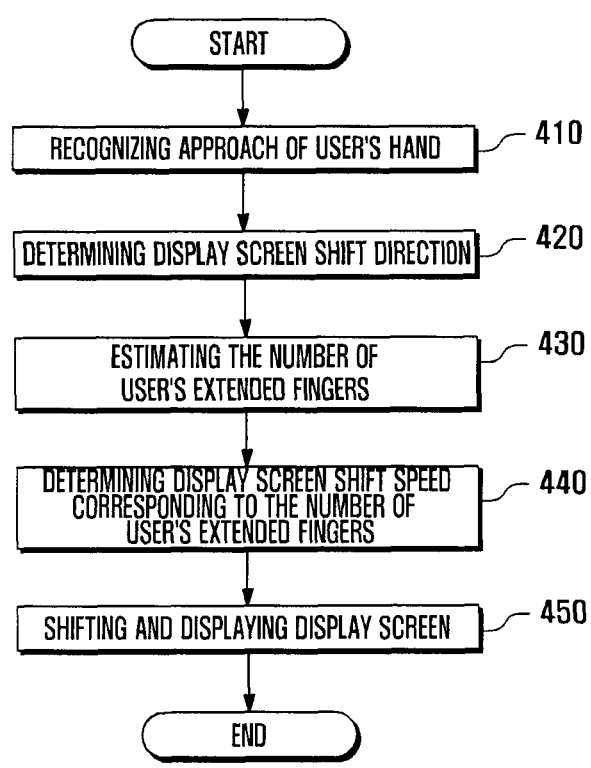
FIG. 4 is a flowchart showing a display control method in accordance with a second embodiment of the present invention.

FIG. 4 is a flowchart showing a method for controlling a display in accordance with a second embodiment of the present invention.

Figure 5:
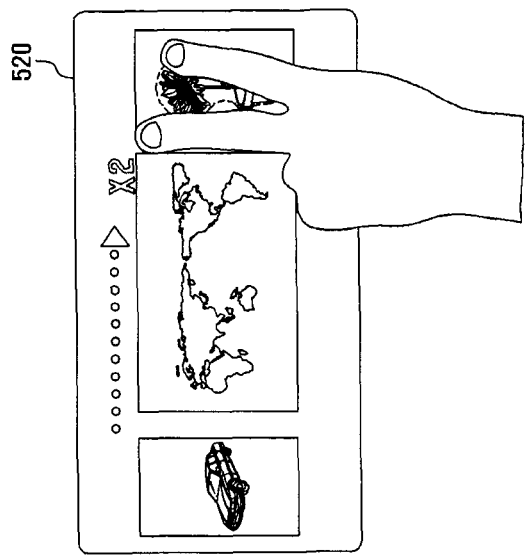
FIG. 5 shows display screens in accordance with the second embodiment of the present invention.
Figure 5:
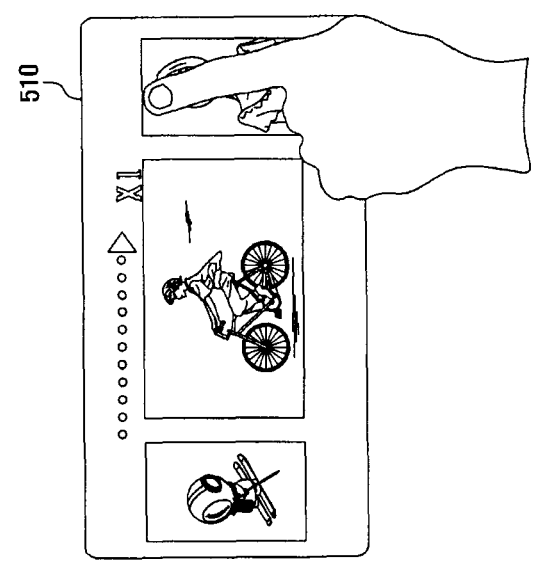

In step 410, the control unit controls the sensor unit 110 to determine whether a user's hand is adjacent to the sensor unit 110. If the user's hand is adjacent to the sensor unit 110, the sensor unit 110 detects light reflected by the user's hand, and transmits a sensor signal containing information concerning the detected light to the control unit 140. On the basis of the sensor signal received from the sensor unit 110, the control unit 140 estimates which direction the user's hand is positioned on the display unit 112. The control unit 140 may determines direction of hands on the display unit 112 based on the information concerning the light detected by the sensor unit 110. Alternatively, the control unit 140 may classify directions with reference to the center of the display unit 112 and estimate which direction the user's hand is positioned. For example, the control unit 140 may classify four directions as top, bottom, left and right with reference to the center of the display unit 112, and estimate which direction the user's hand is positioned among the four directions. As shown on the display screen 510 in FIG. 5, the user approaches his/her thumb to the right end of the display unit 112. The control unit 140 may determines the correct coordinates of the point where the user's thumb is positioned, and estimate that the user's finger is positioned on the right side with reference to the center of the display unit 112.

In step 420, the control unit 140 determines a display screen shift direction on the basis of the direction of the user's hand estimated as described above. In the state as shown on the display screen 510 in FIG. 5, the control unit 140 confirms that the user's hand is positioned on the right end of the display unit 112 and determines the display screen shift direction as right.

In step 430, the control unit 140 estimates the number of the user's extended fingers on the basis of the sensor signal received from the sensor unit 110. The control unit 140 estimates the user's input hand shape by identifying an image information item corresponding to the light detected by the sensor unit 110 among the input hand shape image items stored in the storage unit 120. As shown on the display screen 510 in FIG. 5, the user approaches his/her thumb to the sensor unit 110. In this event, through the data comparison process, the control unit 140 estimates the number of the user's extended finger as one. In the embodiment, the control unit 140 may estimate first the number of the user's extended fingers on the basis of the sensor signal received from the sensor unit 110 so as to determine the display screen shift speed, and then estimate the position of the user's hand so as to determine the display screen shift direction.

In step 440, the control unit 140 determines the display screen shift speed on the basis of the number of the user's extended fingers estimated as described above. Information items concerning a display screen shift speed corresponding to the number of the user's extended fingers is stored in the storage unit 120, and the control unit 140 determines the display screen shift speed on the basis of the stored display screen shift speed information items. In the embodiment, the display screen shift speed rate corresponding to the number of a user's extended fingers being detected.

In step 450, the control unit 140 makes a control to shift the display screen according to the display screen shift speed determined as described above, thereby displaying a new display screen. As shown on the display screen 510 in FIG. 5, as the user moves one finger (thumb) to the right of the display unit 112 in the state in which the thumb is extended, the control unit 112 controls the display unit 112 to shift the display screen with 1×-speed, thereby displaying a new display screen. The 1x-speed corresponds to the basic shift speed value (default) set in the portable terminal 100, wherein the basic shift speed value can be changed according to a user's personal settings.

If the user performs a finger extending action in the state in which the user's hand is positioned adjacent to the sensor unit 110, the sensor unit 110 recognizes that the user's input hand shape has changed, and generates and transmits a sensor signal to the control unit. The control unit 140 estimates whether the position of the user's hand (or the position of a finger) is changed, and determines the display screen shift direction and speed corresponding to a new position. On the display screen 520 in FIG. 5, the user additionally extends his/her middle finger while maintaining the position of his/her hand. As shown, the display unit 112 then displays a screen content after performing a display screen shift with 2x-speed.

In the second embodiment of the present invention, the display screen shift direction is determined according to the position of the user's hand, and the display screen shift speed is determined by the number of a user's extended fingers. Accordingly, the user can browse a desired display screen by adjusting the display screen shift direction and speed through a finger gesture.

Figure 6:
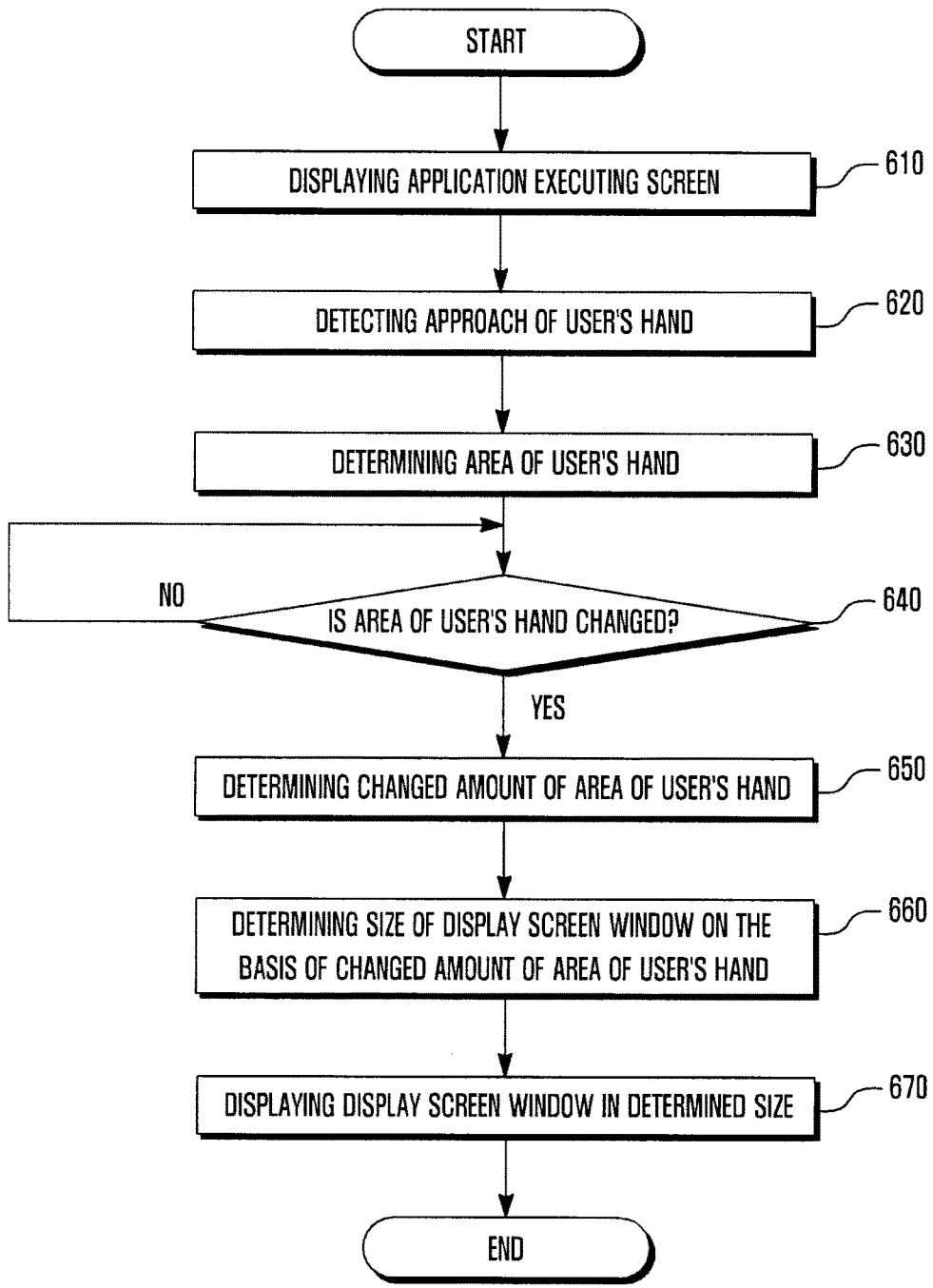
FIG. 6 is a flowchart showing a method for controlling a display in accordance with a third embodiment of the present invention.

FIG. 6 shows a flowchart showing a method for controlling a display in accordance with a third embodiment of the present invention.

Figure 7:
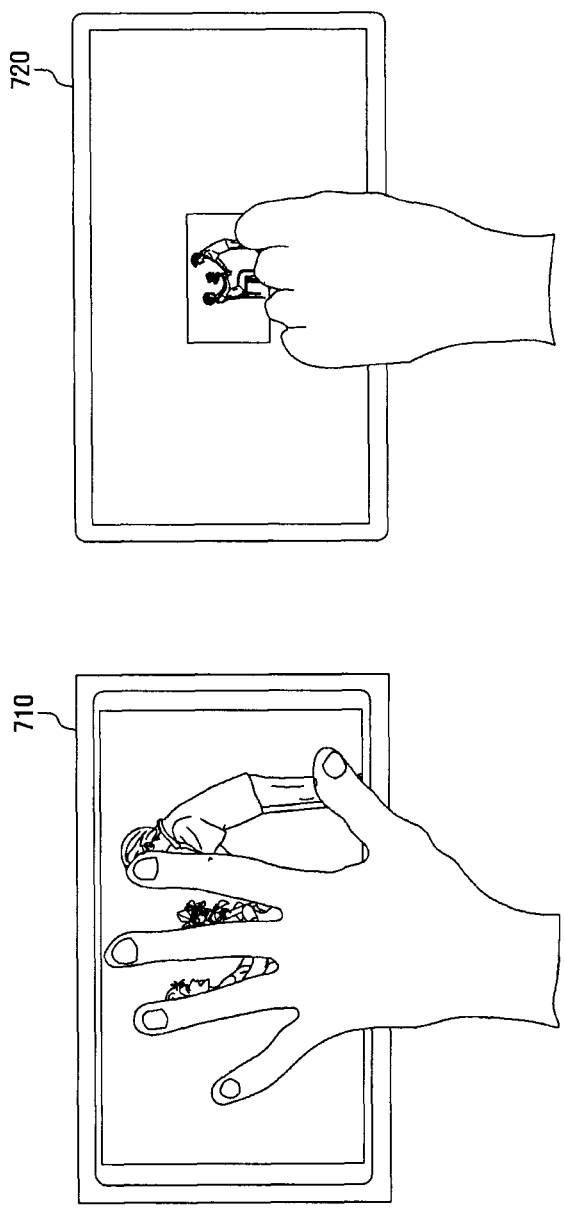
FIG. 7 shows display screens in accordance with the third embodiment of the present invention.

In step 610, at least one of plural applications provided in the portable terminal is executed by the control unit 140, so that an application executing screen is displayed in the display unit 112. As shown on the display screen 710 in FIG. 7, the control unit 140 controls the display unit 112 to display a moving image screen.

In step 620, the control unit 140 controls the sensor unit 110 to estimate whether the user's hand is adjacent to the sensor unit 110. If the user's hand is adjacent to the sensor unit 110, the sensor unit generates and transmits a sensor signal to the control unit 140. According to the present embodiment, after receiving the sensor signal from the sensor unit 110, the control unit 140 may control the display unit 112 to display the objects on screen.

In step 630, the control unit 140 estimates the input area of the user's hand on the basis of the information concerning the detected light included in the sensor signal. Referring to FIG. 8 by way of an example, the control unit 140 calculates the area of the hatched section. In accordance with the present embodiment, the control unit 140 may estimate the lengths of the user's fingers based on the sensor signal received from the sensor unit 140. For example, the control unit may calculate the lengths of a, b and c in FIG. 8.

In step 640, the control unit determines whether the user changes the input hand shape. If the user approaches his/her hand to the sensor unit 110 after extending all five fingers, and then folds his/her fingers gradually, the sensor unit 110 senses that the user's input hand shape has changed, and transmits a sensor signal to the control unit 140. In step 650, the control unit 140 receives the sensor signal from the sensor unit 110, and estimates the changed amount of the input area of the user's hand. When comparing the input area of the user's hand when all five fingers are extended in the beginning with that of the user's hand when one or more fingers are folded, the former will be larger than the latter. Through the changed amount of the input area of the user's hand, the control unit 140 can estimate the folded extent of the user's fingers. For example, when the user approaches his/her hand to the sensor unit 110 as shown in FIG. 8, the sensor unit 110 sensors the user's input hand shape, and generates and transmits a sensor signal to the control unit 140. If the user moves or folds or make a fist, then the lengths of a, b and c will be reduced. The control unit 140 can measure the changed amount of the lengths of a, b and c so as to estimate the folded extent of the user's fingers.

In step 660, the control unit 140 determines the size of the display screen window according to the changed amount of the input area of the user's hand. If the user approaches his/her hand to the sensor unit 110 in the state in which an application executing screen is displayed, the control unit 140 scales the input area of the user's hand and the size of the currently displayed application executing screen window correspond to each other. Then, if the sensor unit 110 senses a reduction of user's hand via folding one or more fingers inward, the control unit 140 measures the changed amount or ratio of the input area of the user's hand, then determines a proportional size of the display screen window according to the reduced hand area being detected. For example, reference numeral 720 shows the change of size of a display screen window when the user's hand changes from open hand to a close hand position. In accordance with the present embodiment, if various sizes of the display screen window, each of which corresponds to an area input by the user's hand, are set, the control unit 140 may estimate an area currently input by the user's hand, and determine the size of the display screen window corresponding to the estimated area.

In step 670, the control unit 140 makes a control to display the display screen window according to the determined size. Further, if a threshold is set for the changed amount or ratio of the input area of the user's hand, and if, after the user folds one or more fingers, the changed amount or ratio of the input area of the user's hand measured by the control unit 140 exceeds the threshold, the control unit 140 can render the currently executed application to be terminated.

Accordingly, by folding or extending one or more fingers, the user can change the size of a display screen window, or control the termination of the currently executed application.

Although exemplary embodiments of the present invention have been described in detail hereinabove, it should be clearly understood that many variations and modifications of the basic inventive concepts herein described, which may apparent to those skilled in the art, will still fall within the spirit and scope of the exemplary embodiments of the present invention as defined in the appended claims.

What is claimed is:

1. A method of controlling an electronic device having a display unit, comprising:
   storing a menu list including a plurality of hierarchical layers, each layer of the plurality of hierarchical layers comprising one or more menu list items;
   detecting a hand disposed over the display unit;
   detecting a count of extended fingers of the hand;
   selecting a depth of the plurality of hierarchical layers based on the count of the extended fingers, the depth indicating a particular layer of the plurality of hierarchical layers; and
   displaying the particular layer of the plurality of hierarchical layers,
   wherein the count of the extended fingers equals the depth at which the menu list is presented after a first layer of the plurality of hierarchical layers is displayed,
   wherein after the first layer is displayed, successive additions to the count of extended fingers cause display of successive additional hierarchical layers at successive depths of the plurality of hierarchical layers, wherein display of each successive additional hierarchical layer includes reducing a display size of all hierarchical layers displayed previously, and wherein a total number of fingers pressed on a touch screen of the display unit equals the selected depth of the plurality of the hierarchical layers.

2. The method of claim 1, wherein the hand over the display unit is detected based on light reflected from the hand.

3. The method of claim 2, wherein detecting the count of the extended fingers comprises identifying an image information item based on the light.

4. The method of claim 1, further comprising detecting a first change in a shape of the hand.

5. The method of claim 4, wherein detecting the first change in the shape of the hand comprises detecting a second change in an area of the hand.

6. The method of claim 1, wherein displaying the plurality of hierarchical layers comprises:
identifying a region of the display unit over which at least one of the extended fingers is positioned; and
displaying at least one of the plurality of hierarchical layers in the identified region.

7. The method of claim 1, wherein the plurality of hierarchical layers includes a top layer of the menu.

8. The method of claim 1, further comprising assigning each of the plurality of hierarchical layers to a different one of the extended fingers, wherein the assigning is performed based on an order in which the extended fingers are arranged.

9. The method of claim 1, wherein at least two of the hierarchical layers are displayed in an order indicating a hierarchical relationship between the at least two layers.

10. An electronic device comprising a display unit, a sensor unit for detecting a hand, and a control unit configured to:
store, in a memory unit, a menu list including a plurality of hierarchical layers, each layer of the plurality of hierarchical layers comprising one or more menu list items;
detect a count of extended fingers of the hand;
select a depth of the plurality of hierarchical layers based on the count of the extended fingers, the depth indicating a particular layer of the plurality of hierarchical layers; and
control the display unit to display the particular layer of the plurality of hierarchical layers, wherein the count of the extended fingers equals the depth at which the menu list is presented after a first layer of the plurality of hierarchical layers is displayed, wherein after the first layer is displayed, successive additions to the count of extended fingers cause display of successive additional hierarchical layers at successive depths of the plurality of hierarchical layers, wherein display of each successive additional hierarchical layer includes reducing a display size of all hierarchical layers displayed previously, and wherein a total number of fingers pressed on a touch screen of the display unit equals the selected depth of the plurality of the hierarchical layers.

11. The electronic device of claim 10, wherein:
the hand over the display unit is detected based on light reflected from the hand; and
the count of the extended fingers comprises identifying an image information item based on the light.

12. The electronic device of claim 11, wherein displaying the plurality of hierarchical layers comprises:
identifying a region of the display unit over which at least one of the extended fingers is positioned; and
displaying at least one of the plurality of hierarchical layers in the identified region.

13. The electronic device of claim 10, wherein the control unit is further configured to assign each of the plurality of hierarchical layers to a different one of the extended fingers, wherein the assigning is performed based on an order in which the extended fingers are arranged.

14. The electronic device of claim 10, wherein at least two of the hierarchical layers are displayed in an order indicating a hierarchical relationship between the at least two layers.

15. The electronic device of claim 10, wherein the plurality of hierarchical layers includes a top layer of the menu.

* * * * *